(12) United States Patent
Katsurabayashi

(10) Patent No.: US 6,618,756 B1
(45) Date of Patent: Sep. 9, 2003

(54) ACTIVITY STATE VIEWING AND RECORDING SYSTEM

(75) Inventor: Hiroshi Katsurabayashi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/385,471

(22) Filed: Aug. 30, 1999

(30) Foreign Application Priority Data

Oct. 1, 1998 (JP) .......................................... 10-279505

(51) Int. Cl.$^7$ ............................................ G06F 15/173
(52) U.S. Cl. ........................ 709/224; 709/205; 709/223
(58) Field of Search ................................ 709/204, 205, 709/224, 223, 225, 227, 229, 318, 313, 217; 702/188, 186; 713/187, 177; 707/9, 104.1; 705/10; 434/350

(56) References Cited

U.S. PATENT DOCUMENTS

| | | | |
|---|---|---|---|
| 5,675,510 A | * 10/1997 | Coffey et al. | 707/104.1 |
| 5,892,917 A | * 4/1999 | Myerson | 709/224 |
| 6,018,619 A | * 1/2000 | Allard et al. | 709/211 |
| 6,029,043 A | * 2/2000 | Ho et al. | 434/350 |
| 6,167,358 A | * 12/2000 | Othmer et al. | 702/188 |
| 6,233,576 B1 | * 5/2001 | Lewis | 707/9 |
| 6,272,538 B1 | * 8/2001 | Holden et al. | 709/223 |
| 6,321,263 B1 | * 11/2001 | Luzzi et al. | 702/186 |

FOREIGN PATENT DOCUMENTS

| | | |
|---|---|---|
| JP | 4-323689 | 11/1992 |
| JP | 5-236131 | 9/1993 |
| JP | 6-266632 | 9/1994 |
| JP | 6-266662 | 9/1994 |
| JP | 7-121529 | 5/1995 |
| JP | 7-210476 | 8/1995 |
| JP | 10-40058 | 2/1998 |

* cited by examiner

*Primary Examiner*—Zarni Maung
*Assistant Examiner*—Kenny Lin
(74) *Attorney, Agent, or Firm*—Oliff & Berridge PLC

(57) ABSTRACT

The states of activities by a plurality of users regarding a given project are kept track of, including activities personally carried out by individual users. An information processing unit processes, upon request from a user, work data in a joint work data management unit and personal work data management units. A shared activity information management unit and personal activity information management units manage joint work data and personal work data in the joint work data management unit and the personal work data management units as activity information. An activity information tracing unit, on the basis of activity information separately managed by the shared activity information management unit and the personal activity information management units, extracts particulars of a sequence of operations performed on a specific activity. The states of activities can be thereby kept track of, including activities personally carried out by individual users.

13 Claims, 9 Drawing Sheets

FIG. 6

PROJECT NAME: P1

| TIME | SHARED DATA NAME | OPERATOR | OPERATING PC NAME | TYPE OF ACTIVITY |
|---|---|---|---|---|
| 1998.4.2 12:20:38 | DOCUMENT 1 | A | fugu | OPENING |
| 1998.4.2 14:22:34 | DOCUMENT 1 | B | Tara | PERSONALIZATION |
| 1998.4.3 9:20:51 | DOCUMENT 2 | C | neko | LOCKING |
| 1998.4.3 9:20:54 | DOCUMENT 2 | C | neko | OPENING |
| 1998.4.3 11:12:58 | DOCUMENT 3 | D | tonnbi | REGISTRATION |
| 1998.4.3 11:32:12 | DOCUMENT 2 | C | neko | ADDITION |
| 1998.4.3 13:32:18 | DOCUMENT 1-1 | B | Tara | PROPOSAL |

| TIME | DATA NAME | PROJECT NAME | RELATED INFORMATION | TYPE OF ACTIVITY |
|---|---|---|---|---|
| 1998.4.2 12:20:38 | DOCUMENT 5 | P2 | | ACQUISITION |
| 1998.4.2 14:20:40 | DOCUMENT 5 | | | OPENING |
| 1998.4.2 13:54:24 | DOCUMENT 5 | | SEE: DOCUMENT 4 | ALTERATION |
| 1998.4.2 14:22:34 | DOCUMENT 1 | P1 | | ACQUISITION |
| 1998.4.3 10:31:51 | DOCUMENT 1-1 | | OLD DATA NAME: DOCUMENT 1, CONTENTS | ALTERATION |
| 1998.4.3 11:12:58 | DOCUMENT 1-1 | P2 | | PROPOSAL |
| 1998.4.3 13:32:18 | DOCUMENT 1-1 | P1 | | PROPOSAL |

| TIME | DATA NAME | LOCATION | OPERATOR | OPERATING PC NAME | TYPE OF ACTIVITY | RELATED INFORMATION |
|---|---|---|---|---|---|---|
| 1998.4.2 12:20:38 | DOCUMENT 5 | P1 | A | fugu | OPENING | |
| 1998.4.2 14:22:34 | DOCUMENT 5 | P1 | B | Tara | PERSONALIZATION | |
| 1998.4.3 10:31:51 | DOCUMENT 5 | B | B | Tara | ALTERATION | OLD DATA NAME: DOCUMENT 1, CONTENTS |
| 1998.4.3 11:12:58 | DOCUMENT 1 | B | B | Tara | PROPOSAL | P2 |
| 1998.4.3 13:32:18 | DOCUMENT 1-1 | B | B | Tara | PROPOSAL | P1 |
| 1998.4.4 15:31:45 | DOCUMENT 1-1 | P2 | G | kame | OPENING | |
| 1998.4.4 15:31:45 | DOCUMENT 1-1 | P2 | G | kame | ALTERATION | |

ACTIVITY STATE VIEWING AND RECORDING SYSTEM

DETAILED DESCRIPTION OF THE INVENTION

1. Field of the Invention

The prevent invention relates to an activity state general viewing system for keeping track, by using a computer, of the circumstances and states of activities where a plurality of persons are working in conjunction, and a computer-readable recording medium on which is recorded such an activity state general viewing program, and more particularly an activity state general viewing system whereby a sequence of activity states are managed at a plurality of locations, and a computer-readable recording medium on which is recorded such an activity state general viewing program.

2. Description of the Related Art

Systems according to the prior art for keeping track of the progress of meetings or discussions are known to persons skilled in the art. For instance in the Japanese Published Unexamined Patent Application No. Hei 4-323689, there is disclosed a "conference progress supporting system," which can officially support the chairperson's grip on the state of the meeting he or she chairs by displaying the duration of speech by each speaker.

There is also known an electronic conference supporting system enabling participants in the supported conference to easily keep track of the progress of the meeting. For instance in the Japanese Published Unexamined Patent Application No. Hei 5-236131, there is disclosed an "electronic conference supporting system," which enables the participants to follow the progress of the meeting by illustrating the sequence of statements and the relationships among the statements. In the Japanese Published Unexamined Patent Application No. Hei 6-266632 is disclosed an "information processing method and apparatus for electronic conference systems," which shows in a window on the display screen the contents of a meeting by displaying the period of speech by each participant in the meeting together with contents of the speech. This facilitates confirmation and reuse of the particulars of the meeting.

There are also known systems for displaying relationships among messages in discussions and meetings by electronic mail. For instance in the Japanese Published Unexamined Patent Application No. Hei 7-210476, there is disclosed an "electronic mail system," which facilitates referencing by associating messages, exchanged by electronic mail, with linking information.

However, these products of the prior art have the following problems.

The inventions disclosed in the Japanese Published Unexamined Patent Applications Nos. Hei 4-323689, Hei 5-236131 and Hei 6-266632, though permitting acquisition and management of information on any visible or audible actions, such as speaking in a meeting, cannot enable the chairperson to recognize such unexpressed actions as reading reference materials and thinking or taking many memos, though not speaking up, during the meeting. There is a further problem that, even though the circumstances during a given meeting can be expressed, events which occurred since the last meeting by the current one or the circumstances of a topic discussed through more than one meeting cannot be kept track of.

The electronic mail system described in the Japanese Published Unexamined Patent Application No. Hei 7-210476 involves the problem that no development following an outgoing mail, such as a transfer or any discussion arising in the absence of the sender, can be known unless a reply is received by the sender of that mail. There is another problem that the writer of a message knows no context to refer to.

Since no prior art allowed keeping track of any user's personal activities, it was impossible to take a comprehensive look at the whole project. Even if, for instance, a proposal made regarding a given project in fact was a diversion of a proposal discussed in connection with another project, the prior art can in no way reveal the fact if the earlier proposal had been part of the personal work of the proponent.

SUMMARY OF THE INVENTION

An object of the present invention, attempted in view of these problems, is to provide an activity state general viewing system for making it possible to keep track of the activity states of a plurality of users involved in a project, including pertinent personal activities by the users.

Another object of the invention is to provide an activity state general viewing method for making it possible to keep track of the activity states of a plurality of users involved in a project, including pertinent personal activities by the users.

Still another object of the invention is to provide a computer-readable recording medium on which is recorded an activity state general viewing program capable of causing a computer to perform operations to keep track of the activity states of a plurality of users involved in a project, including pertinent personal activities by the users.

In order to solve the aforementioned problems, according to the present invention, there is provided an activity state general viewing system for keeping track of the circumstances and states of activities where a plurality of persons are working in conjunction, comprising a plurality of work data management units for storing work data representing the contents of activities; an information processing unit for processing work data in the work data management units in compliance with request from users; a plurality of activity information management units, one provided for each of said work data management units, for managing, as activity information, the particulars of operations performed on work data stored in the corresponding one of said work data management units; and an activity information tracing unit for extracting, on the basis of activity information separately managed by the plurality of said activity information management units, particulars of a sequence of operations performed on a specific activity.

Where such an activity state general viewing system is used, as a user enters an operation request for work data, an information processing unit processes work data within the work data management units to be operated upon. Then, activity information, indicating the particulars of operations, is managed by the activity information management unit. And the activity information tracing unit, on the basis of activity information separately managed by the plurality of said activity information management units, extracts the particulars of a sequence of operations performed on a specific activity.

Also in order to solve the aforementioned problems, there is provided an activity state general viewing method for keeping track of the circumstances and states of activities where a plurality of persons are working in conjunction, whereby particulars of operation performed on work data stored in a plurality of work data management units are managed as activity information for each of said work data management units, and the particulars of a sequence of operations performed on a specific activity are extracted on the basis of activity information managed for each of said work data management units.

By such an activity state general viewing method, as work data stored in a plurality of work data management unit are processed, the particulars of operation are managed for each work data management unit, and the particulars of a sequence of operations performed on a specific activity are extracted on the basis of activity information managed for each of said work data management units.

Further in order to solve the aforementioned problems, there is provided a computer-readable recording medium on which is recorded an activity state general viewing program for keeping track of the circumstances and states of activities where a plurality of persons are working in conjunction, said program causing a computer to function as a plurality of work data management units for storing work data representing the contents of activities; an information processing unit for processing work data in the work data management units in compliance with request form users; a plurality of activity information management units, one provided for each of said work data management units, for managing as activity information the particulars of operations performed on work data stored in the corresponding one of said work data management units; and an activity information tracing unit for extracting, on the basis of activity information separately managed by the plurality of said activity information management units, particulars of a sequence of operations performed on a specific activity.

If a computer is caused to execute such an activity state general viewing program recorded on a recording medium, functions required by the activity state general viewing system pertaining to the invention can be implemented on the computer.

BRIEF DESCRIPTION OF THE DRAWINGS

FIG. 6 shows typical contents of a shared activity information management table held by a shared activity information management device.

FIG. 7 shows typical contents of a personal activity information management table held by a personal activity information management device.

FIG. 8 shows a tracing information management table prepared by an activity information tracing device.

DETAILED DESCRIPTION OF THE PREFERRED EMBODIMENTS

A mode of carrying out the present invention will be described below with reference to the accompanying drawings.

Figure 1:
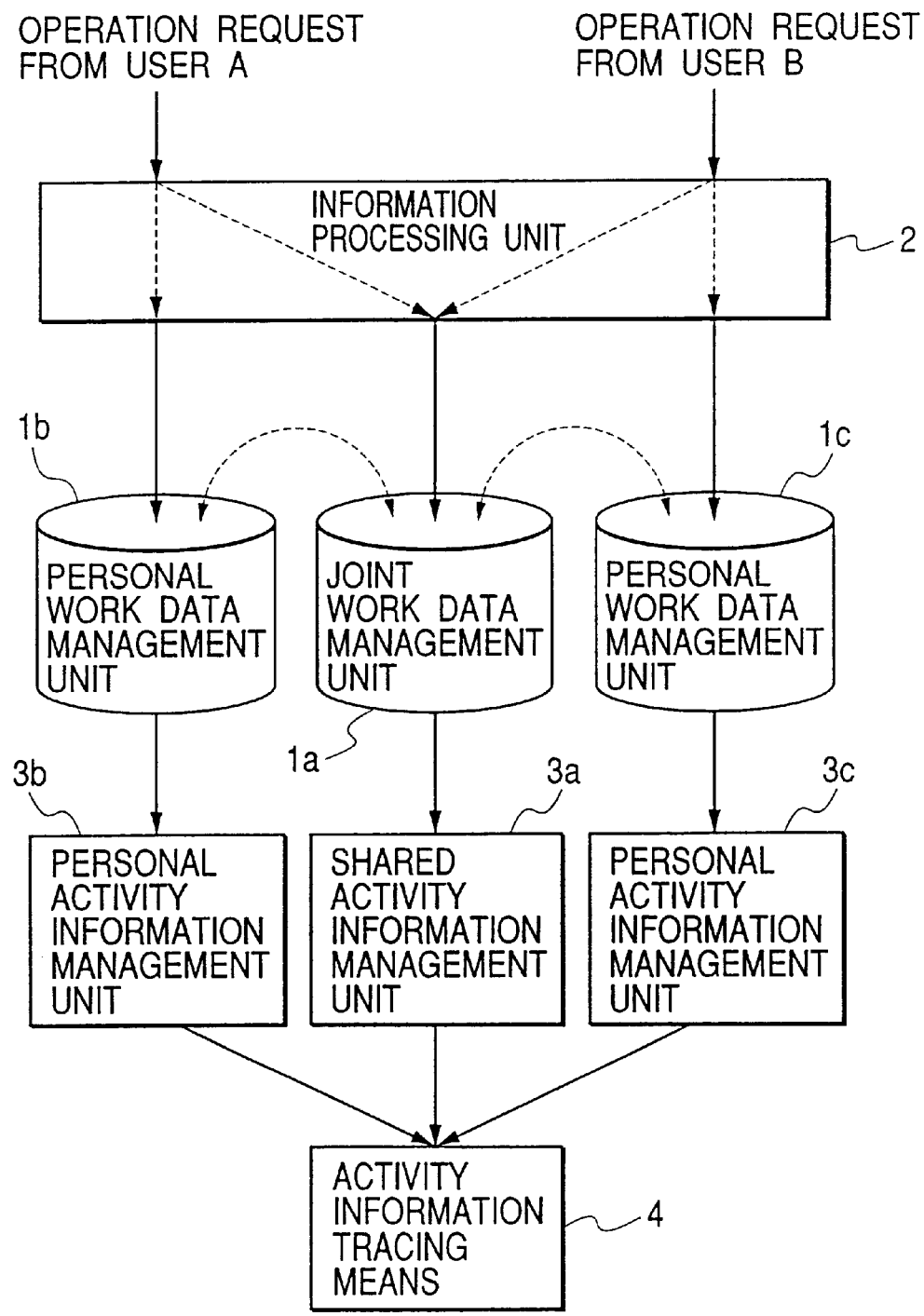
FIG. 1 is a diagram illustrating the configurations of the principle of the present invention.

FIG. 1 is a diagram illustrating the configuration of the principle of the invention. An activity state general viewing system according to the invention consists of a work data management unit 1a, personal work data management units 1b and 1c, an information processing unit 2, a shared activity information management unit 3a, personal activity information management units 3b and 3c, and an activity information tracing unit 4.

The joint work data management unit 1a stores joint work data accessible by a plurality of users out of work data representing the particulars of activities. The personal work data management units 1b and 1c store personal work data each individual user can exclusively use out of work data representing the particulars of activities. It is supposed that, for instance, personal work data in the personal work data management unit 1b are users A's personal data, and personal work data in the personal work data management unit 1c are users B's personal data.

The information processing unit 2 processes, in compliance with request from users, work data in the work data management unit 1a and the personal work data management units 1b and 1c. The ways in which work data are processed include processing separately performed on the joint work data management unit 1a and the personal work data management units 1b and 1c, and processing simultaneously performed on the joint work data management unit 1a and the personal work data management units 1b and 1c. The latter includes, for instance, taking joint work data in the joint work data management unit 1a into the personal work data management units 1b and 1c as personal work data.

The shared activity information management unit 3a manages as activity information joint work data in the joint work data management unit 1a. The personal activity information management units 3b and 3c manage, as activity information, the particulars of operations performed on mutually corresponding personal work data stored in the personal work data management units 1b and 1c.

The activity information tracing unit 4, on the basis of activity information separately managed by the shared activity information management unit 3a and the personal activity information management units 3b and 3c, extracts the particulars of a sequence of operations performed on a specific activity.

Where such an activity state general viewing system is used, as the user enters an operation request for work data, the information processing unit 2 processes work data to be operated upon within the joint work data management unit 1a and the personal work data management units 1b and 1c. Then, the joint work data management unit 1a is managed by the shared activity information management unit 3a, and activity information representing the particulars of operations performed upon joint work data within the personal work data management units 1b and 1c is managed by the personal activity information management units 3b and 3c. And, the activity information tracing unit 4 extracts, on the basis of activity information separately managed by the shared activity information management unit 3a and the personal activity information management units 3b and 3c, the particulars of a sequence of operations performed on a specific activity.

This arrangement makes it possible to grasp the state of activity, even if it is performed by each individual user as personal work, from activity information constituting the contents of the personal activity information management units 3b and 3c. Therefore even if, for instance, user A copies joint work data regarding a certain project into the personal work data management unit 1b, and proposes the copied contents in connection with another project, the system can keep track of the state of activity.

Now, where a plurality of persons engage in a joint task, it is usual for each of the persons to work personally on his or her own personal computer (or work station). In this case, the joint work data are managed on a coordinated activity server connected via a network. Now, a mode of realizing an activity information general viewing system according to the present invention using a plurality of computers via a network will be described below.

Figure 2:
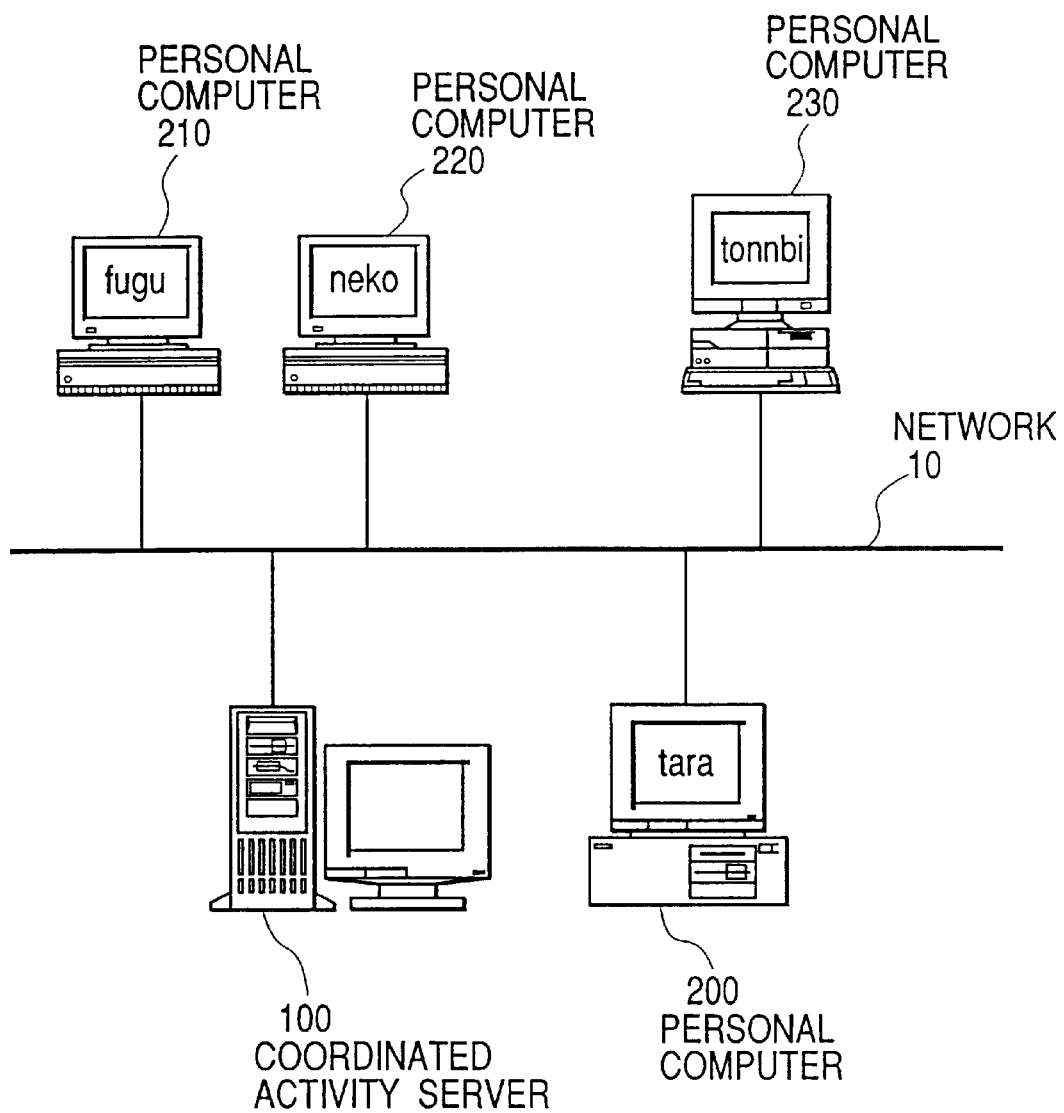
FIG. 2 is a diagram illustrating the overall configuration of an activity information general viewing system pertaining to a mode of carrying out the invention.

FIG. 2 is a diagram illustrating the overall configuration of an activity information general viewing system pertaining to a mode of carrying out the invention. The activity state general viewing system consists of a coordinated activity server 100 and a plurality of personal computers 200, 210, 220 and 230, which are connected by a network 10. The personal computers 200, 210, 220 and 230 are respectively named "tara," "fugu," "neko" and "tonnbi." Incidentally, the usable form of network 10 may consist of either Ethernet or telephone lines.

The coordinated activity server 100 and the personal computers 200, 210, 220 and 230 may be connected by RS232C or other serial ports, parallel ports or infrared rays because the connections need only to permit transmission and reception. It is also acceptable to house the coordinated activity server 100 and other personal computers 200, 210, 220 and 230 in a single case, and connected by the internal buses of the computers.

Figure 3:
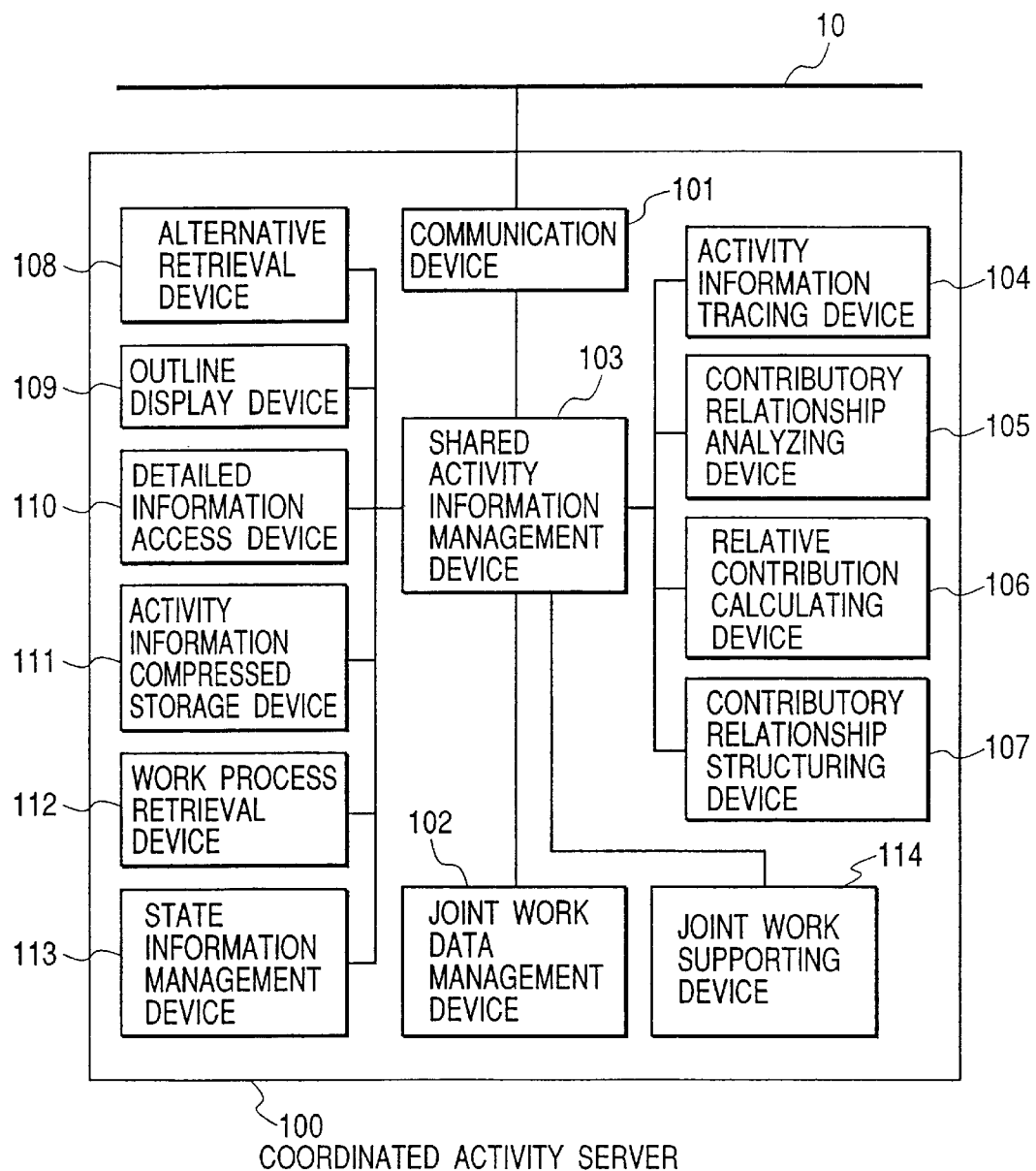
FIG. 3 is a diagram illustrating the internal structure of a coordinated activity server.

FIG. 3 is a diagram illustrating the internal structure of a coordinated activity server. The coordinated activity server 100 is provided with a communication device 101, a joint work data management device 102, a shared activity information management device 103, an activity information tracing device 104, a contributory relationship analyzing device 105, a relative contribution calculating device 106, a contributory relationship structuring device 107, an alternative retrieval device 108, an outline display device 109, a detailed information access device 110, an activity information compressed storage device 111, a work process retrieval device 112, a state information management device 113 and a joint work supporting device 114. The functions of these constituent elements will be described below.

The communication device 101 is a device for exchanging data and the like with other personal computers 200, 210, 220 and 230.

The joint work data management device 102 is a device for storing data including documents for use in joint work, and managing the stored data.

The shared activity information management device 103 is a device for monitoring users' operations on joint work data, acquiring and storing the type of activity, and managing it. The conceivable types of activity include opening and copying of a document, partial copying of its contents, transferring a document, partial transferring of its contents, locking for exclusive control, unlocking, addition of a new document, alteration of contents, alteration of the file name, copying into personal information processing environment (personalization), and copying into shared information processing environment (proposal making).

the activity information tracing device 104 is a device for tracing the continuity of activity information managed by the shared activity information management device 103 and the personal activity information management device 202, to be described later, and preparing a sequence of flow information.

The contributory relationship analyzing device 105 is a device for analyzing the contribution of each participant, and what he or she contributed to the conclusion of the discussion or the result of the project. In documenting the results of a project, for example, other documents which are partly copied into this document or reference in preparing it are regarded as contributing documents. Still other documents which contributed to the contributing documents are searched for, yet other contributing documents are searched for, and so forth. The relationships among the documents and persons having contributed to the results of the project are thereby analyzed. Where the discussion takes place through hypertexts, electronics mails or tools for discussion as well, it can be processed in the same way as project in the conventional manner by identifying the contributing elements from the results of the discussion. For instance, discussion supporting systems including the one disclosed in the Japanese Published Unexamined Patent Application No. Hei 10-40058 (Joint Work Management Method and Joint Work Supporting System) permit tracing of opinions having contributed to the conclusion of the discussion.

The relative contribution calculating device 106 is a device for calculating the relative contribution of each contributing element from the number of opinions which found their way into, or were reference in formulating, the conclusion of the discussion, or that of documents which were reflected in the results of, or reference in discussing, the project. To illustrate conceivable methods of calculating the relative contribution, here is supposed a case in which 5 and 24 opinions of person A respectively found their way into and were referenced in formulating the conclusion of a given discussion against the total numbers of 14 and 80 of opinions reflected in the conclusion and proposed in the course of the discussion, respectively. In this instance, it is possible to use only the number of A's opinions adopted and the total number of opinions adopted, and determine A's contribution points to be 5 (his or her opinions adopted)/14 (the total number of opinions reflected in the conclusion)= 0.36. Or it is also conceivable to differently weight adopted opinions and referenced opinions and assess A's contribution points to be 5 (his or her opinions adopted)/14 (the total number of opinions reflected in the conclusion)+24 (reference opinions)/80 (proposed opinions)×0.2 (weight)= 0.42. Still another conceivable method is to differentiate in weighting opinions which were directly adopted into the conclusion and others which were only partially reflected in the directly adopted ones.

The contributory relationship structuring device 107 is a device for structuring contributory relationship analyzed by the contributory relationship analyzing device. Structuring in this context means the generation of a tree structure representing the contributory relationships which resulted in the conclusion. In this tree structure, the nodes constituting it represent documents, of which the conclusive one is represented by the root node.

The alternative retrieval device 108 is a device for retrieving alternatives, which in this context are opinions which were proposed but not adopted into the conclusion. With respect to a designated conclusion, it searches for unadopted alternatives, selects alternatives as opinions expressed in the course of the discussion, or retrieves those alternatives which involve designated keywords or analogous words or concepts.

The outline display device 109 is a device for generating display frames to facilitate tracing of the flow of discussion by collecting only those documents having contributed to the conclusion (documents the opinions expressed in which were adopted and found their way into the final decision), and to display in a readily understandable way the transitions of documents involved in the results of the project.

The detailed information access device 110 is a device for managing the relationship between a display screen generated by the outline display device 109 to detailed information which reveals the circumstances culminating in the conclusion represented by that outline, accessing the detailed information as requested by a user, and transmitting the contents to the user's personal computer. As the user clicks on his or her personal computer one of a plurality of conclusions displayed as an outline or one of the nodes representing the progress of the project, the structure of the discussion and alternatives proposed in the process leading to that conclusion, or information written during the discussion, are displayed on the display unit of the personal computer.

The activity information compressed storage device 111 reduces the total quantity of activity information by putting together, upon completion of a project, activity information managed by the shared activity information management device 103 and the personal activity information management device 202 and deleting wasteful parts, and curtails the quantity of personal activity information by eliminating activity information on a completed project from the personal activity information management device 202.

The work process retrieval device 112 is a device for retrieving job commissioning relationships within a project managed by the joint work data management device 102, or searching for a way of carrying out a job according to the flow of characteristics of the job as judged from the features of compiled documents. It performs retrieval, designating for example a project having undergone a KJ process (a conceptual organization process formulated by KAWAKITA Jiro), a project involving a patent application task, or a project involving system development by programming.

The state information management device 113 is a device for managing the current state of a project, discussion or the like. Conceivable ways of grasping the current state include one in which, for instance, the number of unpresented opinions managed by the personal activity information management device 202 is referred to and, if the number is large, the state is judged to be one of "study by each participant," or if there are few or no unpresented but many presented opinions, the state is judged to be one of being "out of stock." The number of accesses made to documents concerning the project or discussion is also taken into account in judging the state of that project.

The joint work supporting device 114 acquires information such as that on the choice out of a plurality of proposal presented with regard to a given project by analyzing the particulars of operation on joint work data within the joint work data management device 102, and manages that information. A number of methods are conceivable for determining whether or not a given proposal was adopted. For instance, if the contents of a proposed document are copied into a document stating the conclusion on a given topic, the proposal can be reasonably assumed to have been adopted. Or else, whether or not a given proposal was adopted can be determined by a voluntary designation by a user serving as the chairperson.

Figure 4:
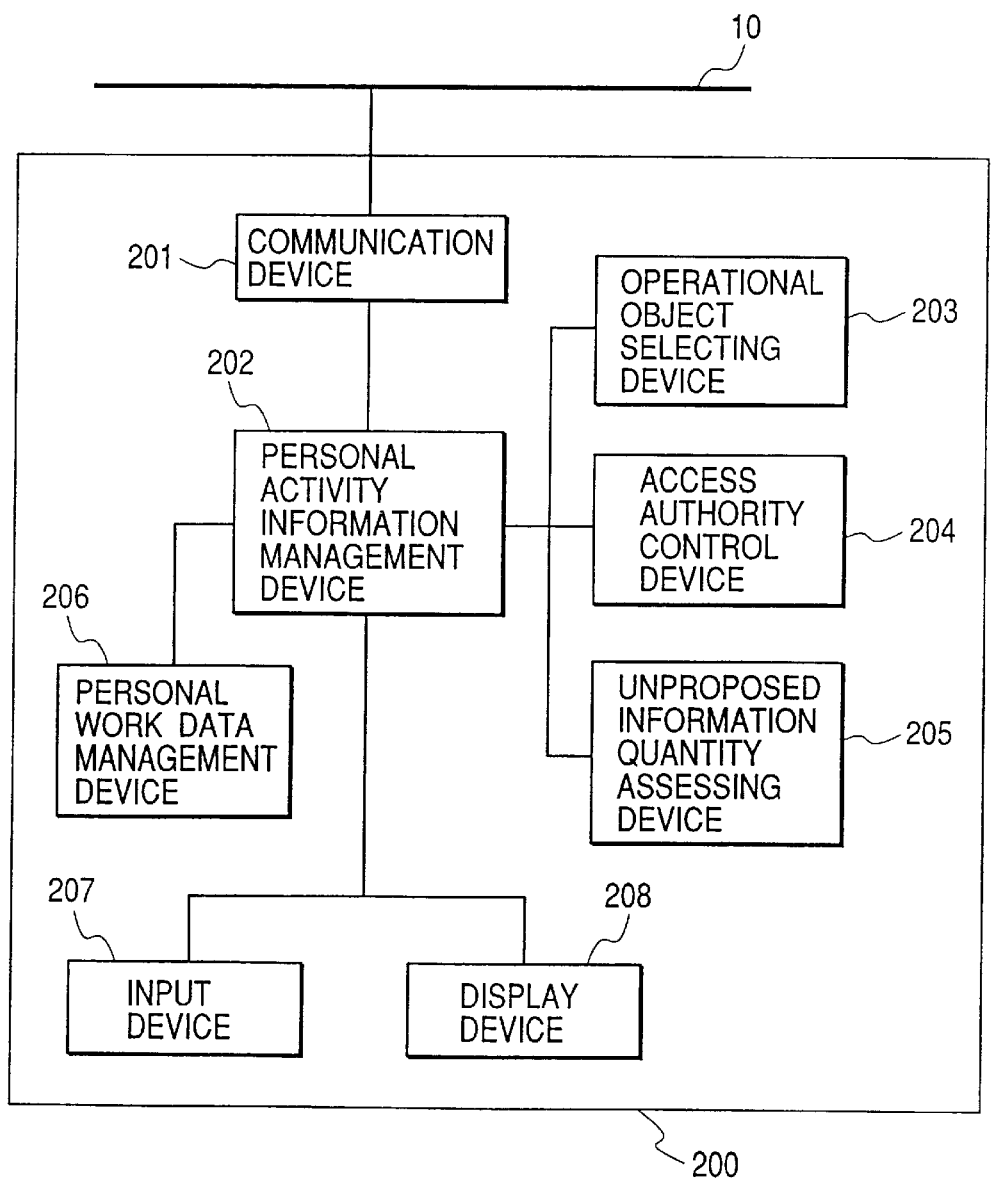
FIG. 4 is a diagram illustrating the internal structure of a personal computer.

FIG. 4 is a diagram illustrating the internal structure of a personal computer. The personal computer 200 is provided with a communication device 201, a personal activity information management device 202, an operational object selecting device 203, an access authority control device 204, an unproposed information quantity assessing device 205, a personal work data management device 206, an input device 207 and a display device 208.

The communication device 201 is a device for carrying out communication to exchange data and the like with the coordinated activity server 100 and other personal computers.

The personal activity information management device 202 is a device for monitoring users' operations on personal work data, acquiring and storing the type of activity, and managing it. The conceivable types of activity include opening and copying of a document, partial copying of its contents, transferring of a document, partial transferring of contents, preparation of a new document, alteration of contents, alteration of the file name, copying into the coordinated activity server, and transferring to the coordinated activity server 100.

The operational object selecting device 203 is a device for looking at a user's state and judging whether an operation done by the user is directed to personal work data or to joint work data. It alters the destination of the communication of the particulars of the operation, depending on the finding of judgment. For instance, in discussion supporting systems including the one disclosed in Japanese Published Unexamined Patent Application No. Hei 10-40058 (Joint Work Management Method and Joint Work Supporting System), writing without authorized access to shared work data or alteration of page or of representation form is judged to be an operation on personal work data, and writing without authorized access is also judged to be an addition of personal work data. Incidentally, authorization of access to shared work data requires advance entry of the registered user name and password into, and authentication by, the coordinated activity server 100.

The access authority control device 204 is a device for judging whether a reply should be given or refused to an inquiry on information managed by the personal activity information management device 202. In this mode of implementation, it is decided by checking with the previously registered user name and password whether or not to give a reply. Besides just giving or not giving a reply, it is also possible to set for each user a different level of access authorization, e.g. not to include internal activity information managed by the personal activity information management device 202, but to include activity information on proposals or personalization arising between the coordinated activity server and a personal computer.

The unproposed information quantity assessing device 205 is a device for assessing the quantity of information which, though prepared into an opinion or written as personal activity, is not presented to the coordinated activity server. Unproposed information may conceivably be either counted as the number of opinions or measured as the quantity of opinions.

The personal work data management device 206 is a device for storing data including documents for use in personal work and managing the stored data.

The input device 207 is a device for entering instructions from a user, such as a keyboard or a mouse.

The display device 208 is a device for displaying a document or the like, such as a cathode ray tube (CRT).

Next will be described the tracing of activity information by an activity information management system in this mode of implementation.

Figure 5:
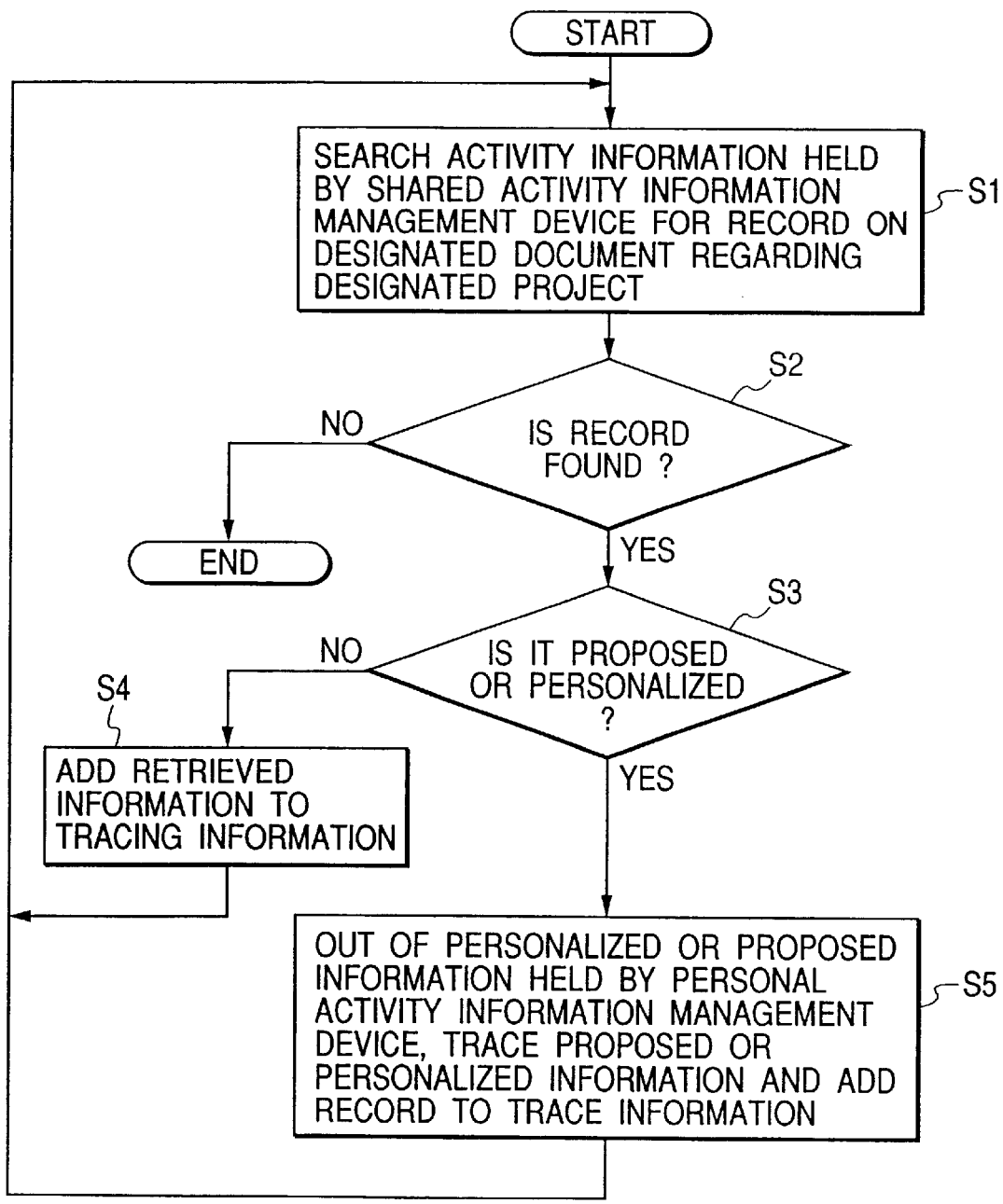
FIG. 5 is a flowchart showing the procedure of operation by an activity information tracing device.

FIG. 5 is a flowchart showing the procedure of operation by the activity information tracing device. This processing is executed between the activity information tracing device 104, on the active side, and other devices while transmitting and receiving information. Activity information tracing is executed when a request to trace activity information is entered from a user's personal computer, and the request is further delivered to the coordinated activity server 100.

[S1] Activity information held by the shared activity information management device 103 is searched for records on a designated document of a designated project.

[S2] It is judged whether there is any record or not. If there is, the processing moves ahead to step S3, or if not, the processing is completed.

[S3] It is judged whether the type of activity is proposal or personalization. If it is either proposal or personalization, the processing moves ahead to step S5, or if not, to step S4.

[S4] The information that has been found is added to the tracing information, and the processing moves ahead to step S1.

[S5] Regarding the operation for personalization or proposal, activity information in the pertinent operator's personal activity information management device is acquired, and the proposed or personalized information is traced. Records obtained by the tracing are added to the tracing information.

If the type of activity of the records sought here is proposal, records are successively detected by searching back from the time set for records in the personal activity information management device, and records are detected for each state of activity until either a record of personalization in the activity type or a record of new preparation in the activity type is detected.

Or, if the type of activity of the records sought here is personalization, records in the personal activity information management device are searched in the order of time, and records are extracted until the same document is newly personalized. The extracted records are then added to the tracing information.

FIG. 6 shows typical contents of a shared activity information management table held by the shared activity information management device. The shared activity information management device 103 holds shared activity information management tables 103a to 103c on a project-by-project basis. The shared activity information management tables 103a to 103c have such items as "time," "shared data name," "operator," "operating PC name" and "type of activity." The "time" refers to the time at which the user performed some operation on joint work data. The "shared data name" refers to the identifier of the joint work data, which constitutes the object of the user's operation, and such identifiers are managed by the joint work data management device 102. The "operator" indicates the name of the user who worked on the joint work data (acquired from information for authentication of the user when he or she is to access the coordinated activity server 100). The "operating PC name" is the name of the personal computer in which the user operated on the coordinated activity server. The "activity type" refers to the type of operation performed by the user.

FIG. 7 shows typical contents of a personal activity information management table held by the personal activity information management device. This example is a case of the personal activity information management table 202a of person B who uses a personal computer named "tara." The personal activity information management table 202a has such items as "time," "data name," "project name," "related information" and "activity type." The "time" refers to the time at which the user performed some operation on personal work data. The "data name" refers to the identifier of the personal work data, which constituted the object of the user's operation. The "project name" indicates the name of the project to which data was proposed or from which data were acquired. The "related information" means information related to activity information. If, for instance, the data name has been altered, the old data name is preserved, and if, while that set of data is open, another set of data is opened, that set of data is registered as reference data. The "activity type" refers to the type of operation the user performed.

Considered here is a case in which a request for tracing of activity information regarding information of "Document 1" of the "P1" project shown in FIG. 7 is entered from the input device 207 of the personal computer 200. The entered request for tracing of activity information is recognized by the personal activity information management device 202, and delivered via the network 10 to the shared activity information management device 103. Then the shared activity information management device 103 selects the shared activity information management table 103a whose project name is "P1" out of the shared activity information management tables 103a to 103c it is holding, and extracts records regarding the designated "Document 1" out of the shared activity information management table 103a. As in the example of FIG. 6, which has two records whose shared data name is "Document 1," both records are extracted.

Next, the shared activity information management device 103 judges whether the activity type of the extracted records is proposal or personalization. In this case, the type of activity done at the time "1998.4.2 12:22:34" is "personalization." Then the shared activity information management device 103 inquires of the personal activity information management device 202 of the personal computer 200 named "tara," which manages personalized information, as to the contents of activity information regarding "Document 1." The personal activity information management device 202, having received this inquiry, acquires activity information regarding "Document 1" from the personal activity information management table 202a shown in FIG. 7.

In the example of FIG. 7, a record regarding "Document 1" is registered on the fourth line. The activity type of this record is acquisition. This resulted from the registration of the processing to personalize "Document 1" as an activity type as viewed from the personal computer 200. Whereas the data name of the record on the fifth line is "Document 1-1," "Old data name: Document 1" is registered as related information. This means that person B altered the document name from "Document 1" to "Document 1-1." Records on the sixth and seventh lines further reveal that "Document 1-1" was proposed for the "P1" project and the "P2" project. Then the personal activity information management device 202 extracts records on the fifth to seventh lines, and returns these records to the shared activity information management device 103.

The shared activity information management device 103, as it knows from the contents of the records received from the personal activity information management device 202 that the data name of "Document 1" has been altered to "Document 1-1," includes in the objects of its tracing records whose data name is "Document 1-1" as well. Further, as "Document 1-1" is also proposed for the "P2" project, it also extracts records from the contents of the shared activity information management table for the "P2" project. As a result, tracing information illustrated in FIG. 8 is generated.

FIG. 8 shows a tracing information management table prepared by the activity information tracing device. This example shows the result of tracing of a sequence of flow information of "Document 1." The tracing information management table 130d has such items as "time," "data name," "location," "operator," "operating PC name," "activity type" and "related information." The "time" refers to the time at which the user performed some operation on either joint work data or personal work data. The "data name" refers to the identifier of the data which constitute the object of the user's operation, and the identifier is managed by the joint work data management device. The "location" indicates the location where the data were when they were operated upon, for which the project name is entered if the location was in the coordinated activity server, or the operator's name is entered if it was in the personal computer operated by the user. The "operator" is the name of the user who operated on the joint work data. The "operating PC name" is the name of the personal computer with which the user operated on the coordinated work server. The "activity type" represents the type of operation done by the user. The "related information" means information related to activity information. If, for instance, the data name has been altered, the old data name is preserved, and if, while that set of data is open, another set of data is opened, that set of data are registered as reference data.

In this manner, it is made possible to trace activity information held by the shared activity information management table and the personal activity information management table on a shared basis. For the traced activity information, visual information is generated by the outline display device 109 to display its outline in an easily understandable way, and delivered to a personal computer. The personal computer displays the delivered visual information on the screen of its display device.

Figure 9:
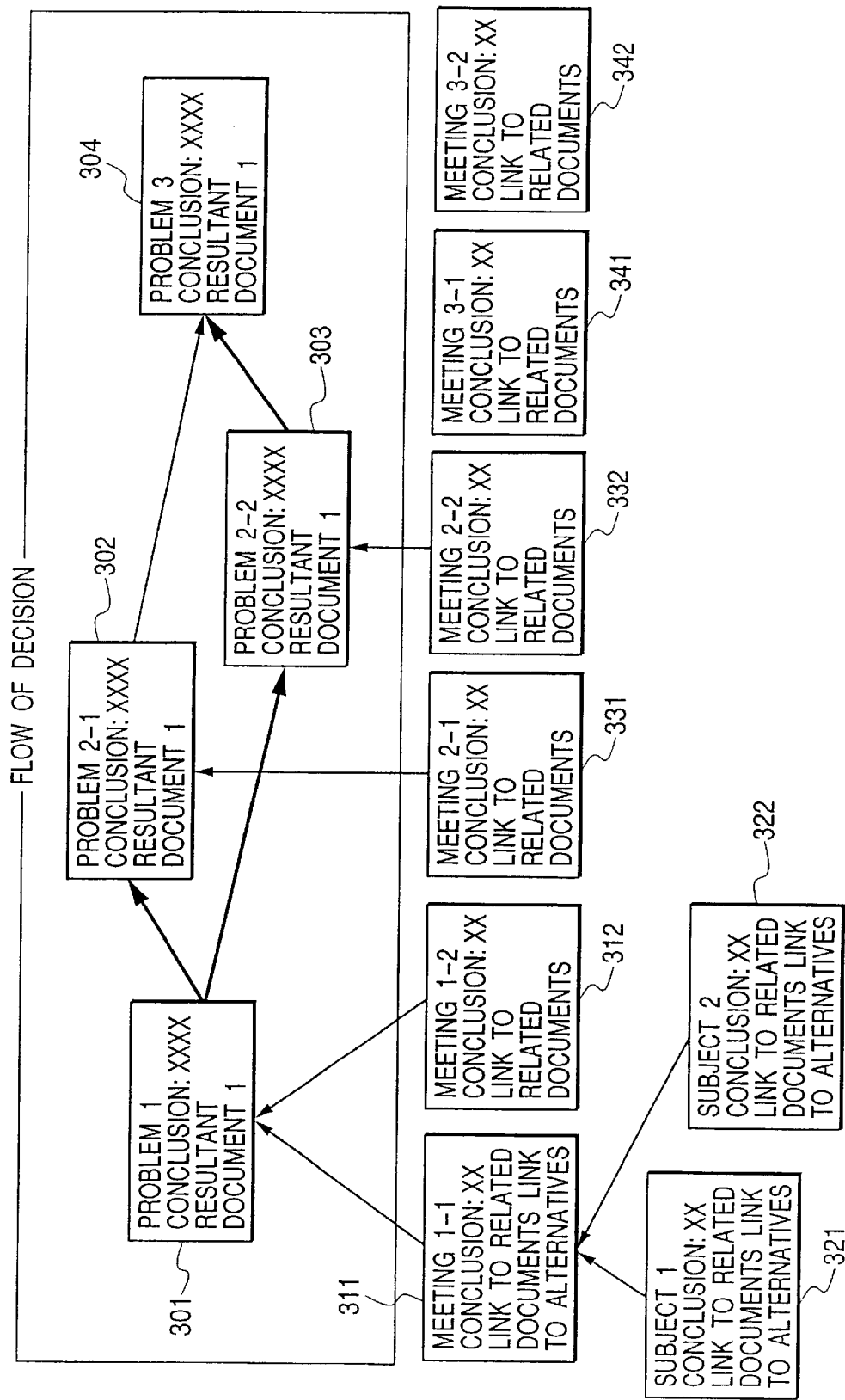
FIG. 9 shows a typical display of traced activity information.

FIG. 9 shows a typical display of traced activity information. This activity information indicates the following: a meeting 311 was held to discuss two subjects, 321 and 322; afterwards, a meeting 312 was convened to discuss the same subjects, and a problem 301 was raised by these two meetings; this problem 301 was divided into problems 302 and 303, which were discussed by meetings 331 and 332, respectively; subsequently, related meetings 341 and 342 were held, and the problems 302 and 303, which had been separately discussed, were integrated into a single problem 304.

Another outline display method is also available, by which the flow of decision making and that of topics discussed until the decision was reached are expressed on the vertical and horizontal axes, respectively.

Next will be described operational object selection processing performed by the operational object selecting device 203. As the user enters an instruction to open a document from the input device 207, the operational object selecting device 203 judges whether the object of operation should be a document in the personal work data management device 206 or one in the joint work data management device 102, and notifies its judgment to the personal activity information management device 202. The personal activity information management device 202 takes out the document designated by the user from the location it has been notified of, and displays it on the screen of the display device. In this state, the user edits or otherwise works on the document. And, as an instruction to store the document is entered from the input device 207 after the editing, the operational object selecting device 203 notifies the personal activity information management device 202 of the source of the document (the personal work data management device 206 or the joint work data management device 102). The personal activity information management device 202 stores the edited document into the location notified by the operational object selecting device 203.

In this manner, irrespective of the nature of the document edited by the user, whether personal work data or joint work data, it can be duly stored in the location it came from.

Next will be described access authority control processing carried out within the personal computer 200. Access authority control processing is carried out when the personal activity information management device 202 is inquired of regarding the contents of the personal activity information management table 202a. On this occasion, the access authority control device 204 checks the pair of user name and password sent simultaneously with the inquiry. If the pair of user name and password is found identical with a pair held in advance by the access authority control device 204, information to permit response is returned to the personal activity information management device 202. Then, the personal activity information management device 202 returns a record in the personal activity information management table matching the inquiry. Or if the pair of user name and password is found identical with no pair registered in the access authority control device 204 in advance, it returns information to that effect to the personal activity information management device 202. In this case, the personal activity information management device 202 sends a message that the inquirer has no access authority in reply to his or her inquiry.

Even if the pair of user name and password is found identical with a previously registered pair, if that user name is subject to restriction on access authority, the extent of that restriction is notified by the access authority control device 204 to the personal activity information management device 202. The restriction may be that, for instance, though activity information on proposal and/or personalization having arisen between the coordinated activity server and a personal computer is included in the reply, internal activity information managed by the personal activity information management device 202 is not. Having received a notification of access authorization with such a restriction, the personal activity information management device 202 returns information within the extent of restriction in response to the inquiry.

Next will be described processing to check unproposed information. Unproposed information is checked when, for example, the chairperson of a meeting wants to know whether or not proposals from the participants have been exhausted. As a request for checking unproposed information regarding a given project is entered from the input device of a personal computer operated by the chairperson, the request is delivered to the shared activity information management device 103 of the coordinated activity server 100. The shared activity information management device 103 inquires of the personal computer of every member of the project designated by the request for checking of unproposed information as to the quantity of unproposed information. The unproposed information in this context means any document acquired or generated but not yet processed as a proposal. In the personal computer 200 having received the request, the unproposed information quantity assessing device 205 counts the number of unproposed documents regarding the designated project, and returns the count to the coordinated activity server 100. The shared activity information management device 103 of the coordinated activity server 100, when the quantity of unproposed information is returned from the personal computer of each member of the project, totals the counts and returns the total count to the personal computer which gave the request for checking unproposed information. The personal activity information management device of the personal computer having received the information on the quantity of unproposed information displays the contents of the information on the screen of the display device. By checking the contents of this display, the chairperson can judge whether or not there may be any more proposal.

Next will be described processing to analyze contributory relationships. Processing to analyze contributory relationships is accomplished by the contributory relationship analyzing device 105 in compliance with a request for contributory relationship analysis from a personal computer. Having received a request for contributory relationship analysis, the contributory relationship analyzing device 105 analyzes information in the joint work data management device 102, and determines what contributed to the conclusion of a discussion or the result of a project. Having determined what contributed, it hands over that information to the relative contribution calculating device 106. The relative contribution calculating device 106 calculates the relative contributions from the number of opinions adopted into the conclusion of, or referenced during, the discussion and the number of documents which found their way into the result of the project, and returns the calculated relative contributions to the contributory relationship analyzing device 105. The contributory relationship analyzing device 105 hands over to the contributory relationship structuring device 107 the result of analysis of relative contributions indicating who contributed how much to the conclusion of a discussion or the result of a project. The contributory relationship structuring device 107 structures the received result of analysis of relative contributions, and returns the structured result of the personal computer having made the request for contributory relationship analysis. The personal computer, having receiving the structured result of relative contribution analysis, displays its contents on the screen of the display device. This enables each user to recognize who made greater contributions to the process leading to the conclusion, and at the same time to confirm what opinions were greatly reflected in the conclusion.

Next will be described processing to retrieve alternatives. Alternative retrieval processing is executed when a user, using a personal computer, enters a request for retrieval of alternatives discussed in the course of arriving at a given conclusion. The alternative retrieval request entered from the personal computer is delivered to the alternative retrieval device 108 of the coordinated activity server 100. The alternative retrieval device 108, having received the alternative retrieval request, retrieves unadopted ones among the opinions proposed in the process leading to the conclusion, and returns the retrieved opinions to the personal computer having made the alternative retrieval request. If any keyword id designated in the alternative retrieval request, only those proposals contain that keyword are extracted. If the designation requires searching for analogous words as well, proposals containing terms resembling the keyword either in spelling or in concept are also extracted.

Next will be described processing to access detailed information. Processing to access detailed information is initiated when a user clicks, on a personal computer, one of the plurality of conclusions displayed on the screen for displaying an outline prepared by the outline display device 109 or one of the nodes expressing the progress of a project. If specified by such a user, a request for acquisition of detailed information is delivered to the coordinated activity server 100 together with information indicating a document such as a designated conclusion. The request for detailed information acquisition is delivered to the detailed information access device 110. The detailed information access device 110 generates visual information for displaying in a manner which facilitates keeping track of the flow of discussion leading to the designated or that of the joint work so far, and at the same time makes possible access to the circumstances of the discussion leading to that conclusion or result or alternatives from the conclusion or the interim result of the joint work. The generated visual information is returned to the client computer, and displayed on the screen of the display device of the client computer.

Next will be described compressed storage processing of activity information on completed joint work (project). Compressed storage processing takes place when a user serving as the chairperson enters an instruction to complete a project. When an instruction to complete a project is entered from a personal computer, that instruction is delivered to the activity information compressed storage device 111 of the coordinated activity server 100. The activity information compressed storage device 111 puts together sets of activity information separately managed by the shared activity information management device 103 and the personal activity information management device 202, and deletes redundant parts. For instance, as the personalization record in the shared activity information management table and the acquisition record in the personal activity information management table refer to one and the same operation, either record can be deleted. In this manner, the overall quantity of activity information is reduced and, at the same time, activity information on the completed project is deleted from the personal activity information management device 202. Records on completed projects are thereby deleted from personal computers for more effective utilization of the memory capacities of the personal computers.

Next will be described work process retrieval processing. Work process retrieval processing takes place when a user enters a work process retrieval request into a personal computer. The work process retrieval request entered into the personal computer is delivered to the work process retrieval device 112. The work process retrieval device 112 retrieves job commissioning relationships within a project managed by the joint work data management device 102, or a way of carrying out a job according to the flow of characteristics of the job as judged from the features of compiled documents. The result of retrieval is delivered to the personal computer having made the work process retrieval request, and displayed on the display device of that personal computer. For instance, it is made possible to analyze activity information on other projects addressing similar problems to those involved in the project to be undertaken, and to find out information on the way in which past projects were carried out and their conclusions. This enables experience gained from the implementation of one project to be utilized in another project by other users who did not participate in the past project.

Next will be described processing to supply state information. Processing to supply state information takes place when a user, using a personal computer, enters a request for acquisition of state information on a given project. The request for acquisition of state information entered into the personal computer is delivered to the state information management device 113 of the coordinated activity server 100. The state information management device 113 collects the personal activity information of users participating in a designated project, and judges the state of the location of that project from the contents of the collected personal activity information and the shared activity information managed by the shared activity information management device 103. It judges, for instance, whether the participants are studying the project or have run out of ideas. The determined state information is returned to the personal computer having made the request for acquisition of state information.

As hitherto described, the present invention makes possible tracking of the state of activity including personally undertaken work. For instance, if the invention is applied to a "conference progress supporting system" such as the one disclosed in the Japanese Published Unexamined Patent Application No. Hei 4-323689 referred to in the description of the prior art, the chairperson can be aware of a state in which participants in the meeting want to think, looking at reference materials, or one in which some of them are taking many memos but do not speak up, and can lead the meeting efficiently on that basis. The chairperson can keep track of the meeting either at the level of an outline of decisions or at the level of details including alternatives presented in the meantime, and can also know what other proposals were made, which were discussed but did not find their way into the decisions.

Furthermore, as the invention allows separate management of the authority to access a document itself and that to access pertinent activity information, a user can learn about the way of carrying out a job even if he or she is not allowed access to the contents of the pertinent document, and can presume the likely location of required information.

To add, the above-described processing functions can be realized with a computer. In that case, the particulars of processing by the functions the activity state general viewing system is required to have are described in a program recorded on a computer-readable recording medium. By causing a computer to execute this program, the above-described processing functions can be realized with a computer. Computer-readable recording media usable for this purpose include magnetic recording devices and semiconductor memories. For marketing purposes, the program may be stored on portable recording media such as compact disk read only memories (CD-ROMs) or floppy disks, or may be stored in the memory of a computer connected via a network, and transferred to another computer via the network. When the program is to be executed by a computer, it can be stored in the hard disk unit or the like of the computer, and loaded onto its main memory.

As hitherto described, in the activity state general viewing system according to the present invention, sets of activity information indicating operations performed on a plurality of work data management units are managed by the respectively corresponding activity information management units, and the activity information tracing unit extracts, on the basis of separately managed activity information, the particulars of a sequence of operations performed on a specific activity, with the result that, even if individual sets of work data are not shared data, the particulars of a sequence of operations performed on a specific activity can be extracted on the basis of activity information on each set of work data, making it possible to keep accurate track of the progress of that activity.

Also, by the activity state general viewing method according to the invention, the particulars of a sequence of operations performed on a specific activity are extracted on the basis of activity information managed by separate work data management units, making it possible for the particulars of a sequence of operations performed on a specific activity, even if individual sets of work data are not shared data, to be extracted on the basis of activity information on each set of work data, and to keep accurate track of the progress of that activity.

Furthermore, the computer-readable recording medium recording thereon an activity state general viewing program according to the invention, makes it possible, by executing the recorded activity state general viewing program with a computer, to cause the computer to perform processing whereby sets of activity information indicating operations performed on a plurality of work data management units are managed by the respectively corresponding activity information management units, and the activity information tracing unit extracts, on the basis of separately managed activity information, the particulars of a sequence of operations performed on a specific activity. As a result, when the computer operates on work data, even if individual sets of work data are not shared data, the particulars of a sequence of operations performed on a specific activity can be extracted on the basis of activity information on each set of work data, making it possible to keep accurate track of the progress of that activity.

What is claimed is:

1. An activity state general viewing system for keeping track of circumstances and states of activities where a plurality of persons are working in conjunction on said activities, the system comprising:

a plurality of work data management units for storing work data representing contents of the activities;

a state information management unit for judging and managing the state of the activities including presented and unpresented contributions by the plurality of persons working on the activities;

an information processing unit for processing work data in the work data management units in compliance with requests from users;

a plurality of activity information management units, one provided for each of said work data management units, for managing, as activity information, particulars of at least one operation performed on work data, stored in the corresponding one of said work data management units;

a relative contribution calculating unit for calculating the relative contribution of each of the plurality of persons including presented and unpresented contributions; and an activity information tracing unit for extracting, on a basis of activity information, separately managed by the plurality of said activity information management units, data representative of particulars of a sequence of operations performed on a specific activity.

2. The activity state general viewing system, as claimed in claim 1, wherein:

said work data management units comprise a joint work data management unit for managing joint work data available for use by a plurality of users, and personal work data management units for managing personal work data each of which is available for exclusive use by a user, and said activity information management units comprise a shared activity information management unit for managing activity information regarding at least one operation performed on joint work data, managed by said joint work data management unit, and personal activity information management units, one for each of the plurality of users, for managing activity information regarding at least one operation performed on personal work data managed by said personal work data management units.

3. The activity state general viewing system, as claimed in claim 2, further provided with an access authority control unit for determining whether or not to permit access to said personal activity information management unit from said activity information tracing unit.

4. The activity state general viewing system, as claimed in claim 3, wherein said access authority control unit effects access authority control separately over, (a) access to operational information that is complete within said personal activity information management units, and (b) operational information including transmission and reception to and from outside said personal activity information management units.

5. The activity state general viewing system, as claimed in claim 2, provided with an unproposed information quantity assessing unit for assessing the quantity of information not proposed as joint work data, out of all activity information managed by said personal activity information management units.

6. The activity state general viewing system, as claimed in claim 2, further provided with a contributory relationship analyzing unit for analyzing a contents of (a) activity information managed by said shared activity information management, and (b) said personal activity information management units, and determining what aspect of a conclusion or project each person has contributed to.

7. The activity state general viewing system, as claimed in claim 6, further provided with a relative contribution calculating unit for analyzing the contents of (a) activity information managed by said shared activity information management unit, and (b) said personal activity information management units, and determining how much each person has contributed to the conclusion or project.

8. The activity state general viewing system, as claimed in claim 7, further provided with an alternative retrieval unit for analyzing a contents of activity information managed by said activity information management unit, and retrieving, as possible alternatives to the conclusion, unadopted opinions which were among opinions proposed in a process leading to the conclusion but did not find their way into the conclusion.

9. The activity state general viewing system, as claimed in claim 1, further provided with an activity information compressed storage unit for collecting activity information regarding completed joint work in said activity information management unit, and storing the activity information in a compressed form by deleting any duplicated information regarding any similar operation.

10. The activity state general viewing system, as claimed in claim 1, further provided with a work process retrieval unit for retrieving job commissioning relationships within a project managed by said joint work data management unit.

11. The activity state general viewing system, as claimed in claim 1, further provided with a state management unit for managing a state of a project on a basis of activity information managed by said activity information management units.

12. An activity state general viewing method for keeping track of circumstances and states of activities where a plurality of persons are working in conjunction on said activities, whereby:

particulars of at least one operation performed on work data stored in a plurality of work data management units are managed as activity information for each of said work data management units, states of activities are judged and managed by a state information management unit, including presented and unpresented contributions by the plurality of persons working on each activity;

data representative of particulars of a sequence of operations performed on a specific activity are extracted by an activity information tracing unit on a basis of activity information managed for each of said work data management units; and relative contributions of each of the plurality of persons working on each activity are determined, including presented and unpresented contributions, by a relative contribution calculating unit.

13. An activity state general viewing program, recorded on a computer-readable recording medium, for keeping track of circumstances and states of activities where a plurality of persons are working in conjunction on said activities, said program causing a computer to function as:

a plurality of work data management units for storing work data representing contents of the activities;

an information processing unit for processing work data in said work data management units in compliance with request from users;

a state information management unit for judging and managing the state of each activity, including presented and unpresented contributions;

a plurality of activity information management units, one provided for each of said work data management units, for managing, as activity information, particulars of at least one operation performed on work data stored in a corresponding one of said work data management units;

a relative contribution calculating unit for calculating the relative contribution of each of a plurality of persons working on each activity, including presented and unpresented contributions; and an activity information tracing unit for extracting, on a basis of activity information separately managed by the plurality of said activity information management units, data representative of particulars of a sequence of operations performed on a specific activity.

* * * * *